July 19, 1966 G. K. JOHNSON 3,261,300
TOW TRUCK SWITCHING SYSTEM
Filed Aug. 10, 1964 4 Sheets-Sheet 1

INVENTOR
GRAHAM K. JOHNSON

BY Seidel & Gonda

ATTORNEYS.

July 19, 1966 G. K. JOHNSON 3,261,300
TOW TRUCK SWITCHING SYSTEM
Filed Aug. 10, 1964 4 Sheets-Sheet 2
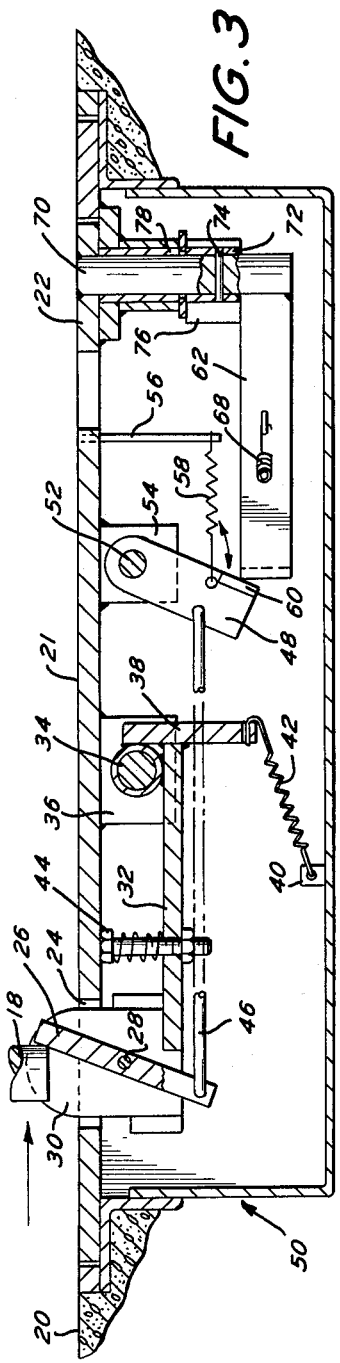
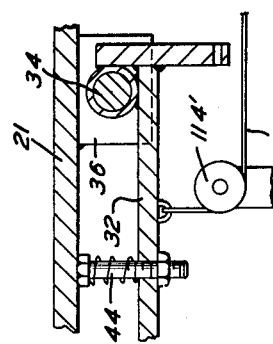
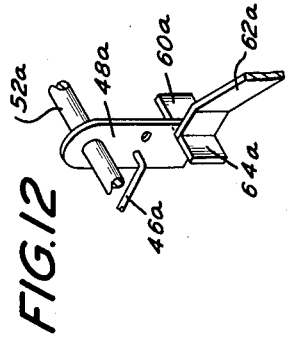
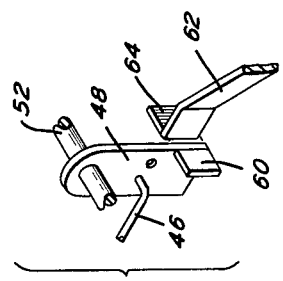
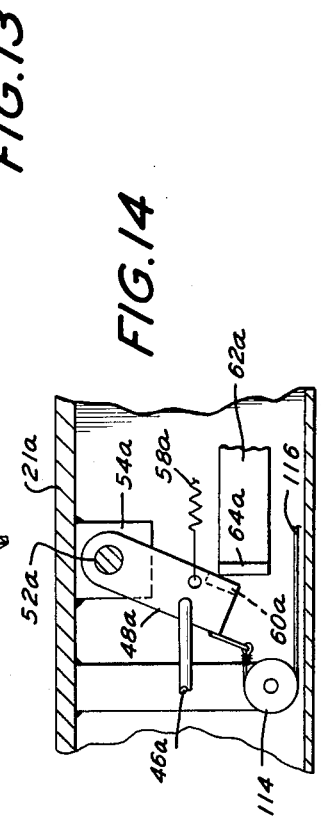
INVENTOR
GRAHAM K. JOHNSON
BY Seidel & Gonda
ATTORNEYS.

July 19, 1966   G. K. JOHNSON   3,261,300
TOW TRUCK SWITCHING SYSTEM
Filed Aug. 10, 1964   4 Sheets-Sheet 3
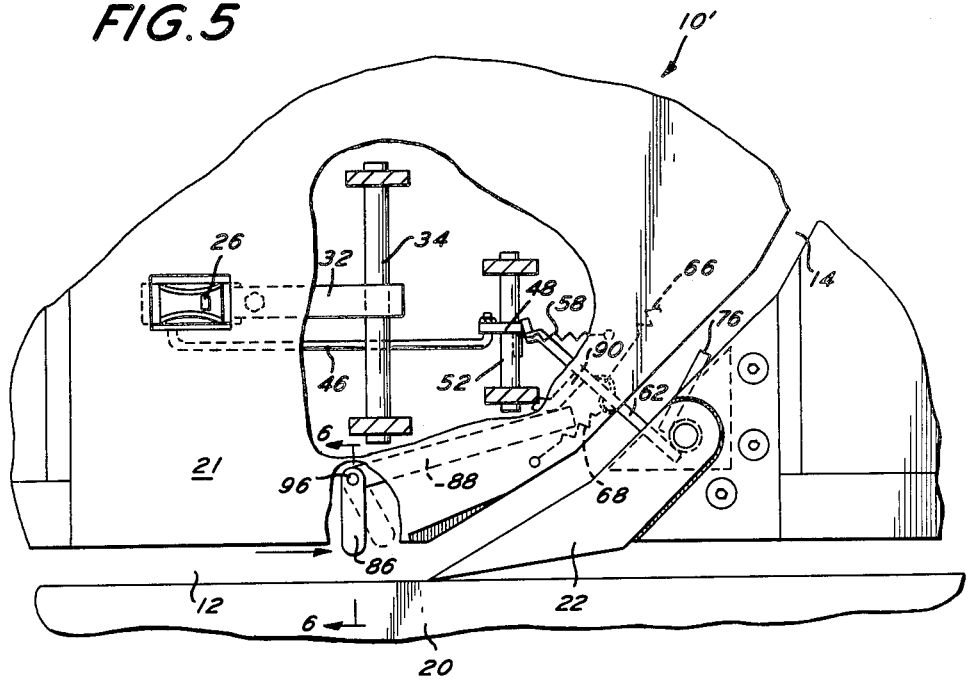
FIG.5
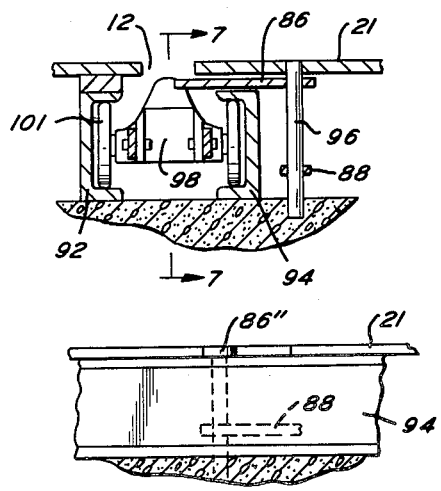
FIG.6
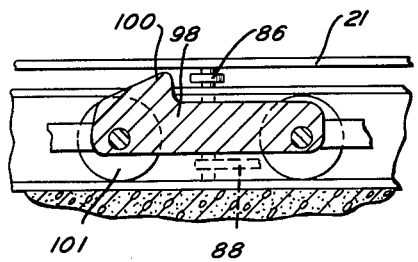
FIG.7
FIG.8   FIG.9
INVENTOR
GRAHAM K. JOHNSON
BY
ATTORNEYS.

July 19, 1966  G. K. JOHNSON  3,261,300
TOW TRUCK SWITCHING SYSTEM
Filed Aug. 10, 1964  4 Sheets-Sheet 4

INVENTOR
GRAHAM K. JOHNSON

BY Seidel & Gonda

ATTORNEYS.

United States Patent Office 3,261,300
Patented July 19, 1966

3,261,300
TOW TRUCK SWITCHING SYSTEM
Graham K. Johnson, Easton, Pa., assignor to SI Handling Systems, Inc., Easton, Pa., a corporation of Pennsylvania
Filed Aug. 10, 1964, Ser. No. 388,469
20 Claims. (Cl. 104—88)

This invention relates to a tow truck switching system wherein a tow truck may be caused to be diverted from movement along a main slot to movement along a shunt slot.

The switching means of the present invention is associated wtih a reference surface such as the floor in a building. The reference surface has a main slot which is intersected at spaced points therealong by shunt slots. Adjacent the intersection of each shunt slot and the main slot, there is provided a switch plate member mounted for rotation about an axis which is generally perpendicular to the plane of the reference surface. The switch plate member is normally biased to one side of the main slot.

Selectively operable means, preferably responsive to actuation by a selector pin on a tow truck, is provided adjacent to switch plate member and structurally interrelated therewith. When actuated, the selectively operable means moves the switch plate member to a position obstructing the main slot and opening the shunt slot. Patent 3,103,183 is considered to be the exemplary of the prior art.

It is an object of the present invention to provide a novel tow truck switching system.

Another object of the present invention is to provide a tow truck switching system including a switch plate at the juncture of main and shunt slots which is caused to be moved from an inoperative to an operative position by means independent of the tow pin.

Another object of this invention is to provide a tow truck switching system having a switch plate at the juncture of main and shunt slots which is operative in response to a preselected position of a selector pin on the tow truck to cause the tow pin on the truck to move from the main slot to the shunt slot.

A still further object of the present invention is to provide a tow pin switching system having a switch plate at the juncture of the main and shunt tow pin slots which insures that only a predetermined number of tow trucks may be shunted into any one particular shunt slot.

A still further object of the present invention is to provide a tow pin switching system including a switch plate at the juncture of a main and shunt tow pin slot and means to prevent the accidental diversion of a tow pin from the main slot to a shunt slot by an indiscriminate positioning of the switch plate.

Other objects will appear from the disclosure which follows hereinafter.

For the purpose of illustrating the invention, there are shown in the drawings forms which are presently preferred; it being understood, however, that this invention is not limited to the precise arrangements and instrumentalities shown.

FIGURE 3 is a cross sectional view taken substantially along the plane indicated by the line 3—3 of FIGURE 2.

FIGURE 4 is an enlarged fragmentary detailed perspective view of a portion of the mechanism for moving the switch plate of the system from an inoperative to an operative position.

FIGURE 5 is a top plan view of a slightly modified form of tow truck switching system.

FIGURE 6 is a cross sectional view taken substantially along the plane indicated by the line 6—6 of FIGURE 5.

FIGURE 7 is a cross sectional view taken substantially along the plane indicated by the line 7—7 of FIGURE 6.

FIGURE 8 is a view similar to FIGURE 7, but illustrating a slightly modified form of one of the components of the system depicted in FIGURE 5.

FIGURE 9 is a view similar to FIGURE 7, but illustrating a slightly modified form of one of the components of the tow pin switching system depicted in FIGURE 5.

FIGURE 12 is a fragmentary perspective view similar to FIGURE 4 but illustrating the embodiment of FIGURE 10.

FIGURE 13 is a sectional view illustrating how the treadle could be deactivated by the overload protection means.

FIGURE 14 is a sectional view taken along the line 14—14 in FIGURE 10.

Figure 1:
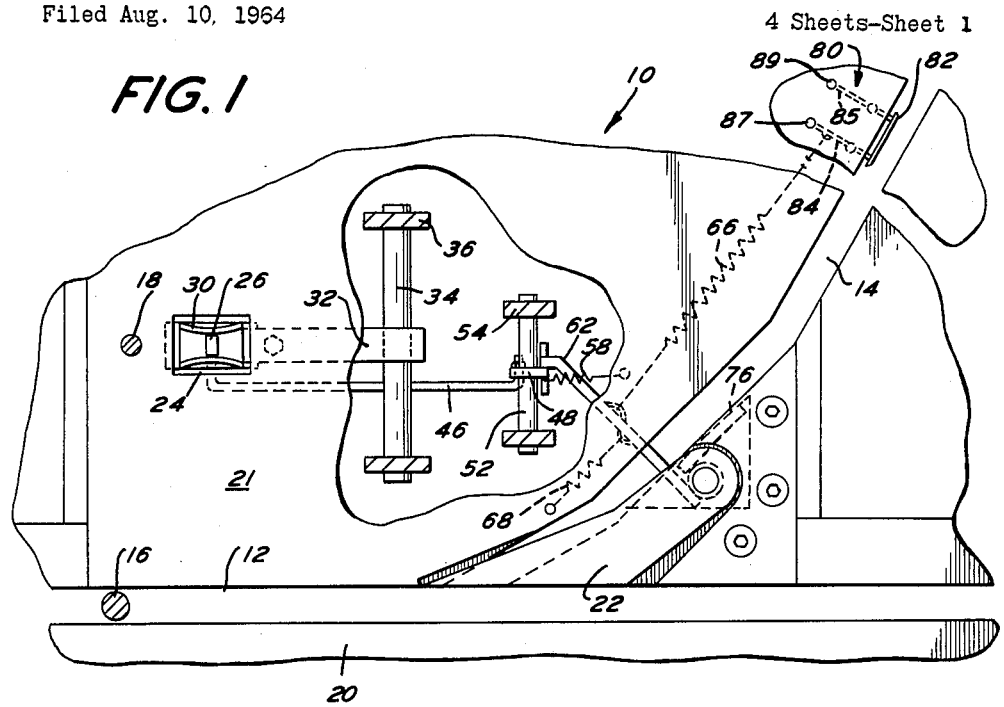
FIGURE 1 is a top plan view of the tow truck switching system comprising the subject matter of the instant invention with certain portions of the system broken away for the purpose of illustration and showing the switch plate member of the system in its inoperative position.
Figure 2:
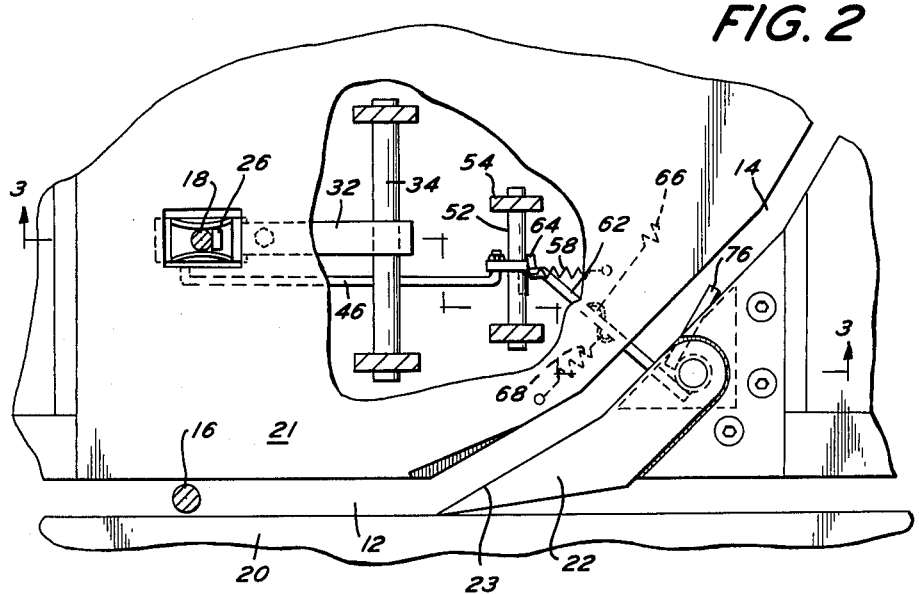
FIGURE 2 is a top plan view similar to FIGURE 1 but illustrating the switch plate member of the system in its operative position to cause the tow pin on a tow truck to be diverted from movement along a main slot to movement along a shunt slot.
Figure 10:
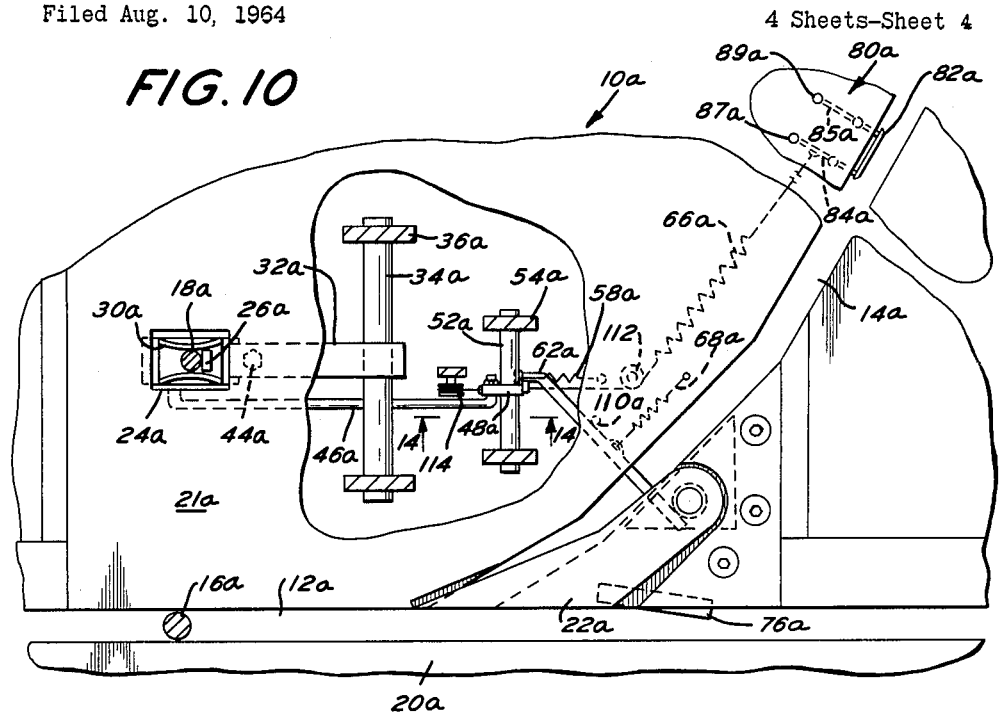
FIGURE 10 is a plan view similar to FIGURE 1 but illustrating another embodiment.
Figure 11:
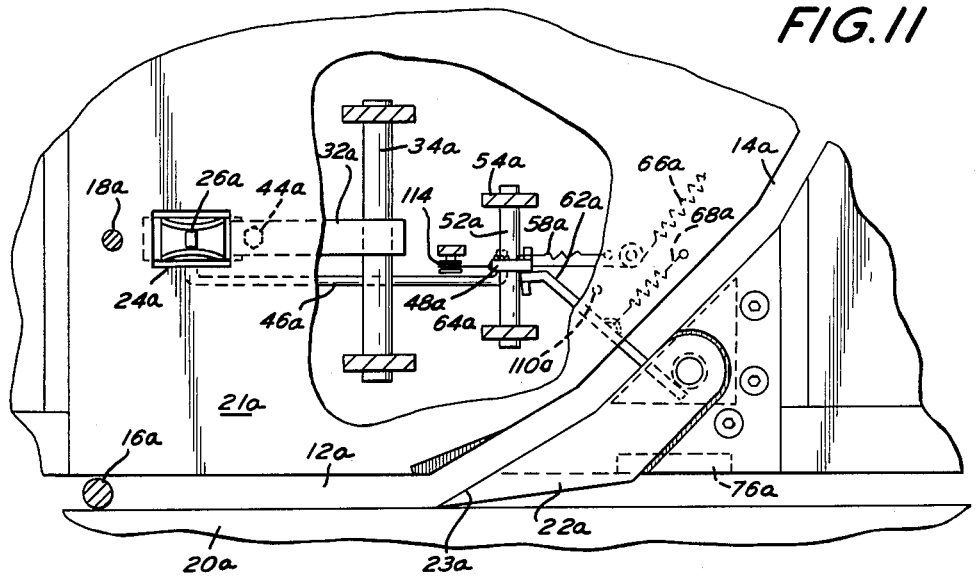
FIGURE 11 is a plan view similar to FIGURE 2 but illustrating the embodiment of FIGURE 10.

Referring now to the drawings wherein like numerals indicate like elements, and more particularly FIGURES 1-3, one embodiment of the tow truck switching system is generally designated by the numeral 10.

The tow truck switching system 10 includes a reference surface 20 such as a floor or the like, having a main slot 12 therein. Below the main slot 12, there is generally provided a drag line or conveyor means which is adapted to contact the tow pin 16 of a tow truck and thereby propel the tow truck along the main slot 12.

The main slot 12 is intersected at spaced points therealong by a plurality of shunt slots which may extend to either side of the main slot. As illustrated in FIGURES 1 and 2, the main slot 12 is intersected by a shunt slot 14. The switch plate 22 normally closes the entrance to the shunt slot 14 from the main slot 12, as shown in FIGURE 1. If the switch plate 22 is moved to the position illustrated in FIGURE 2, the main slot is obstructed and the tow pin 16 will follow the contour of surface 23 of the switch plate 22 and enter the shunt slot 14.

In order to effect movement of the switch plate 22 from its inoperative position as shown in FIGURE 1 to its operative position as shown in FIGURE 2, a tow truck is provided with one or more substantially rigid upright selector pins 18. Selector pin 18 singularly or in conjunction with other similar pins is adapted to initiate movement of the switch plate from inoperative to operative position.

The reference surface or floor 20 is preferably provided with a removable plate 21 having a slot 24. Mounted beneath the plate 21 is a housing generally designated by the numeral 50. Supported within the housing and extending upwardly through the aperture or slot 24 in the plate 21 is a pair of opposed parallel plates 30. The plates pivotally mount a treadle or movable abutment 26 between them by means of a pivot pin 28. The distance from slot 12 and each treadle 26 varies for the intersection of each shunt slot 14 and main slot 12.

The plates 30 are rigidly mounted on one end of a platform 32. At its opposite end, the platform 32 is welded or otherwise secured to a shaft 34 journaled in a pair of spaced parallel brackets 36 projecting downwardly from the reference surface or floor 20. An arm 38 is welded or otherwise secured to the shaft 34 and projects downwardly from the shaft below the platform 32. A coil spring 42 connects one end of the arm 38 to a lug 40 mounted on the housing 50.

Hence, if the plates 30 are accidentally depressed in a vertical direction, the platform 32 and treadle 26 will pivot about the shaft 34 and the arm 38 will be moved against the bias of the spring 42. The spring 42 will then return the platform 32, plates 30, and treadle 26 to a position wherein the plates 30 and the treadle 26 extends upwardly out of the slot 24 as illustrated in FIGURE 3. Hereinafter, the plate 30 may be referred to as a protector means adjacent the treadle 26 to prevent treadle 26 from being inadvertently actuated and to cause treadle 26 to move into the plane of plate 21 when subjected to an unintentional force having a downward force component.

A spring biased bolt 44 extends through the platform 32 intermediate its ends. A spring disposed about the shank of the bolt 44 cushions the return of the platform 32. The bolt 44 is also used to determine and adjust the height to which treadle 26 extends above the slot 24.

The treadle 26 is connected by means of a connecting rod 46 to a catch crank or latch 48 pivotally mounted by means of a pivot shaft 52 between a pair of spaced brackets 54 projecting downwardly from the plate 21. The catch crank 48 is biased to a substantially upright position by means of a coil spring 58 connected at one end to the catch crank 48 and at its other end to an upright pin 56 projecting downwardly from the plate 21. The catch crank 48 also includes a tab 60 projecting laterally from a lower front edge thereof.

In its upright position, catch crank 48 is in abutment with one end of a switch arm 62. The switch arm 62 is biased in a counterclockwise direction as viewed in FIGURE 1 by means of a tension spring 68. An elongated tension spring 66 is also connected to the switch arm 62 and opposes the bias of the spring 68 when said spring 66 is tensioned. The function of the spring 66 will be described more particularly hereinafter. The relationship between tab 60 on catch crank 48 and extension 64 or arm 62 is described hereinafter.

At its end remote from the catch crank 48, the switch arm 62 is welded or otherwise secured to a shaft 70 rotatable within a bearing 78 projecting downwardly from the plate 21. At its end remote from the switch arm 62, the shaft 70 is welded or otherwise secured to the switch plate 22. It should thus be apparent, that if the catch crank 48 is rotated in a clockwise direction as viewed in FIGURE 3, the switch arm 62 will be allowed to rotate in a counterclockwise direction as viewed in FIGURES 1 and 2, due to the bias of the spring 68. Rotation of the switch arm 62 in a counterclockwise direction in FIGURE 2 will effect rotation of the shaft 70 and positioning of the switch plate 22 in its operative position as shown in FIGURE 2.

A pin 74 connects a collar 72 for rotation with the shaft 70. Welded or otherwise secured to the collar 72 is a switch plate return arm 76. When the switch plate 22 is rotated to its operative position as viewed in FIGURE 2, the return arm 76 will project into the shunt slot 14. When the tow pin 16 strikes the return arm 76 after the tow truck has been switched for movement along the shunt slot 14, the arm 76 will be rotated in a clockwise direction as viewed in FIGURE 2 to reposition the switch plate 22 and the switch plate arm 62 in their inoperative position.

The operation of the tow truck switching system 10 is substantially as follows:

It will first be assumed that a selector pin 18 is positioned upon a tow truck in a conventional fashion and at a position wherein it will strike the treadle 26 as the tow pin 16 moves along and is guided by the main slot 12.

As the selector pin 18 passes between the side plates 30, it will strike the treadle 26 and rotate it in a clockwise direction as viewed in FIGURE 3. Rotation of the treadle 26 in a clockwise direction as viewed in FIGURE 3, will cause the connecting rod 46 to move to the left as viewed in FIGURE 3. Movement of the connecting rod 46 will in turn cause the catch crank 48 to rotate in a clockwise direction against the bias of the spring 58, causing the spring 58 to be placed under tension.

When the catch crank 48 rotates in a clockwise direction, the switch arm 62 will be released. The spring 68 will cause the switch arm 62 to rotate in a counterclockwise direction as viewed in FIGURES 1 and 2. Rotation of the switch arm 62 in a counterclockwise direction will rotate the shaft 70 in a counterclockwise direction and position the switch plate 22 in its operative position as viewed in FIGURE 2. Rotation of the shaft 70 also causes the collar 72 to rotate in a counterclockwise direction. Rotation of the collar 72 in a counterclockwise direction will cause the switch plate return arm 76 to project into the shunt slot 14. Further rotation of the switch arm 62 is prevented by abutment of extension 64 on the front end of the switch arm 62 with the front face of tab 60 on the catch crank 48.

The bias of the spring 68 on the switch arm 62 is greater than the bias of the spring 58 tending to pull the catch crank 48 back to its upright disposition. Hence, when the selector pin 18 clears the treadle 26, the components of the switching system 10 will remain in their position as shown in FIGURE 2. Continued movement of the tow truck will cause the tow pin 16 to engage the surface 23 of the switch plate 22 and cam the tow pin into the shunt slot 14.

When the tow pin enters the shunt slot 14, its momentum will be sufficient to carry it past the return arm 76. Contact of the tow pin 16 with the return arm 76 will cause the shaft 70 to rotate in a clockwise direction returning the switch plate 22 to its inoperative position as viewed in FIGURE 1. Clockwise rotation of the shaft 70 will cause the switch arm 62 to be swung in a clockwise direction beyond catch crank 48 and against the bias of the spring 68. The spring 58 will then move the catch crank 48 forward into its upright disposition into abutment once again with the side face of the end of the switch arm 62. The tab 60 on the end of the catch crank 48 insures that switch arm 62 is not caught on the opposite side of the catch crank 48 and thereby interfere with arm 62 being able to return to its inoperative position.

The platform 32, arm 38, shaft 34 and spring 42 insure that the treadle 26 and plates 30 project upwardly through slot 24. It should also be understood that the selector pin 18 can be positioned on the tow truck to contact various treadles spaced at different distances to one side of the main slot 12. This allows for the use of a substantial number of shunt slots in the switching system. Overload protection means are also provided in the switching system 10 for preventing a tow truck jam in any particular shunt slot.

The overload jam preventive mechanism includes a four bar parallel linkage system generally designated by the numeral 80 pivotally mounted beneath the reference surface 20 at a point along the shunt slot 14 adjacent the end thereof remote from slot 12. The linkage system 80 includes a bar 82 projecting into the slot 14 and parallel links 84 and 85. Link 84 is connected to one end of the tension spring 66 by a cable. As tow trucks are stacked one behind the other in the shunt slot 14, a preceding tow truck will push the next preceding tow truck further up the slot 14. When a tow pin on a truck engages the bar 82, the bar is pivoted out of the way and stays there until the truck is removed whereby bar 82 is returned to its illustrated position by spring 66. Bar 82 is pivotably connected to each of the links 84 and 85 which in turn are mounted for pivotable movement about points 87 and 89 respectively. When a predetermined number of tow trucks have been deposited along the shunt slot 14, the first tow truck's tow pin will move the bar 82 and obstruct its return. Movement of the bar 82 will cause the links 84 and 85 to pivot and tension spring 66.

The tensioning of the spring 66 overcomes the bias of the spring 68 on switch arm 62. Hence, subsequent actuation and movement of the catch crank 48 will not affect the positioning of the switch arm 62. The spring 66 will prevent the spring 68 from rotating the switch arm 62 in a counterclockwise direction as viewed in FIGURES 1 and 2. Therefore, the switch plate 22 will thus be maintained in its inoperative disposition at all times when the shunt slot 14 is occupied by a predetermined number of tow trucks.

Referring now to FIGURES 5 to 9, a slightly modified form of a tow truck switching system is generally designated by the numeral 10'. Elements corresponding to the elements in the tow truck system 10 are indicated by like numerals.

The tow truck switching system 10' differs from the tow truck switching system 10 by the inclusion of a safety mechanism for preventing accidental rotation of the switch plate 22 to an operative position and hence improper diversion of the tow truck into a shunt slot 14.

The safety mechanism includes a lever 86 projecting into the main slot 12. The lever 86 is fixed to a shaft 96 journaled between the plate 21 and the subjacent building structure. Fixed to the shaft 96 is an arm 88. One end of the arm 88 is adapted to abut an arm 90 projecting laterally from the switch arm 62 intermediate its end.

The tow pin main slot 12 is formed in the reference surface 20 and in plate 21. Beneath the reference surface 20 and plate 21 is a track defined by a pair of oppositely facing channels 92 and 94. A drag line or conveyor comprising a plurality of links and wheels 101 are in rolling engagement with the channels beneath the main slot 12. The conveyor is adapted to engage the tow pin 16 in a conventional manner as is well known in the art.

In accordance with the tow truck switching system 10', the drag line or conveyor is provided with a special link 98 or dog section in advance of the dog section on the drag line chain or conveyor which engages the tow pin 16. The link 98 includes a cam portion 100 adapted to contact the lever 86, rotate the lever 86, shaft 96 and arm 88 in a counterclockwise direction as viewed in FIGURE 5.

The operation of the tow truck switching system 10' is as follows:

It is assumed that the treadle 26 has been accidentally pivoted as shown in FIGURE 3 so as to cause the catch crank 48 to be released from blocking engagement with the switch arm 62. The switch arm 62 will thus have been rotated by the spring 68 to cause the switch plate 22 to be biased to an operative position wherein the tow pin 16 on a tow truck moving along the main slot 12 will enter the shunt slot 14.

As the tow truck proceeds along the main slot 12, the cam portion 100 on the link 98 will contact the lever 86 and rotate it in a counterclockwise direction as viewed in FIGURE 5. The arm 88 will thus be rotated in a counterclockwise direction as viewed in FIGURE 5. Rotation of the arm 88 in a counterclockwise direction will cause the switch arm 62 to rotate in a clockwise direction because the arm 88 imparts movement to the switch arm 62 in a clockwise direction through the arm 90. When the arm 62 clears the catch crank 48, the spring 58 will return the catch crank to its upright position.

Rotation of the switch arm 62 in a clockwise direction causes the switch plate 22 to be returned to its inoperative position. The catch crank 48 will prevent the bias of the spring 68 from being operative on the switch arm 62. Hence, the tow pin 16 will continue its travel in the main slot 12, rather than being inadvertently diverted into the shunt slot 14.

In the event that the tow pin 16 is supposed to enter the shunt slot 14, the selector pin 18 can reactivate the treadle 26 and the switch plate 22 since it trails the cam portion 100 on the conveyor. Therefore, the correct movement of the tow truck will be insured.

FIGURE 8 illustrates that a lever 86" may be provided in lieu of the lever 86. The lever 86" may be disposed in the same plane as the reference surface 20 or plate 21. With such an arrangement, the tow pin 16 may activate the lever 86 and arm 88. It should be understood that the tow pin 16 in such a tow truck will be in advance of the selector pin 18 on the tow truck so that the selector pin 18 may reactivate switch plate 22 if it is desired that the tow pin enter the shunt slot 14.

FIGURE 9 illustrates still another arrangement of a lever which may be used as a safety device in the tow truck system 10'. In the embodiment of FIGURE 9, the lever 86 is replaced by a lever 86' which extends through a slot 102 in the channel 94. The lever 86' may be activated by any of the wheels 101 on the conveyor or drag line chain. Since the selector pin follows any portion of the drag line chain or conveyor, it can reactivate the switchplate 22, if necessary.

In place of arm 76, a latch may be provided to hold the switchplate 22 in its operative position. In that case, any suitable release mechanism may be provided along the shunt 14 for contact with a portion of the tow truck to release the latch whereby the switch plate would be biased to its inoperative position.

The reference surface 20 along slot 14 preferably slopes downwardly away from slot 12 at an angle of from about ¼ degree to about 1 degree. In this manner, the trucks disposed along slot 14 move therealong at a faster rate. In this regard, there is no conveyor means below slot 14. Hence, the trucks coast along slot 14 slowly under gravity. It has been found that the speed of the conveyor means below slot 12 can be increased up to 50% when the surface 20 along slot 14 is so sloped.

In FIGURES 10–12 and 14, there is illustrated another embodiment of the present invention designated generally as 10a and identical with system 10 except as will be pointed out hereinafter. Accordingly, corresponding elements of system 10a have corresponding numerals followed by "a." As will be recalled, the switchplate 22 of system 10 is biased by spring 68 to a position wherein it may obstruct the main slot 12.

In switching system 10a, the switchplate 22a is biased to a position wherein it obstructs shunt slot 14a and has a surface forming a portion of the slot 12a. As shown more clearly by comparison in FIGURES 4 and 12, the relative positons of the tab 60a and extension 64a are reversed. However, the same relationship exists in each of systems 10 and 10a as pertaining to the catch crank 48a performing the same function as catch crank 48. Thus, catch crank 48a prevents spring 68a from biasing the switchplate 22a to the position illustrated in FIGURE 10 except when catch crank 48a is pivoted to a disposition corresponding to that of catch crank 48 in FIGURE 3.

When the arm 62a is biased under the pressure of spring 68a, it abuts a limit stop 110a. The overload jam preventative mechanism 80a is connected to the catch crank 48a by means of a cable 116 which extends around pulleys 112 and 114. Hence, catch crank 48a is prevented from rotating in a counterclockwise direction in FIGURE 14 by means of spring 66a and cable 116 when a predetermined number of trucks have accumulated along slot 14a. Prevention of such relative movement of catch crank 48a, against the bias of spring 58a enables spring 68a to bias arm 62a and plate 22a to the position in FIGURE 10. Subsequent tripping of treadle 26a would have no effect on plate 22a. In each of systems 10 and 10a, the effect of the overload protection means is the same.

Thus, it will be seen that system 14a differs from system 10 in the manner in which the overload protection means accomplishes its intended function and in the direction in which the switchplate is biased. System 10a is desirably utilized in preference to system 10 under certain conditions. For example system 10a may be utilized when it is desired to have a system wherein a large number of trucks will be shunted into one slot except when it is desired to have a relatively small number of trucks shunted into a different slot.

In view of the description of the operation of system 10, it is not believed necessary to describe the operation of system 10a in detail. It is believed sufficient to point out that the tow pin 16a on each truck will be shunted from movement along slot 12a to movement along slot 14a. When the selector pin 18a on the truck actuates the treadle 26a, catch crank 48a will rotate about the longitudinal axis of shaft 52a from the position illustrated in FIGURE 10 to the position illustrated in FIGURE 11. As a result thereof, spring 68a will bias the arm 62a from the position illustrated in FIGURE 11 to the position illustrated in FIGURE 10. Thereafter, the tow pin 16a will continue to move along slot 12. When pin 16a engages the return arm 76a, the switchplate 22a is rotated from the position illustrated in FIGURE 10 back to the initial starting position illustrated in FIGURE 11. Spring 68a immediately moves plate 22a to the closed position in FIGURE 10 so long as catch crank 48a is held in the position illustrated in FIGURE 14 by cable 116. Thus, it will be noted that system 10a is substantially a reversal of the parts of system 10 insofar as the switchplate is concerned.

In FIGURE 13 there is illustrated an alternative embodiment for the connection of the overload protection means 80 in system 10. Thus, cable 116' may have one end connected to spring 66 and its other end extending around a pulley corresponding to pulley 112 but not shown and around pulley 114' for connection to platform 32. When a predetermined number of trucks have accumulated along slot 14, means 80 is activated to rotate treadle 26 and platform 32 around the longitudinal axis of shaft 34 to pull treadle 26 toward the plane of reference surface 20 and through slot 24 so that it can no longer be activated by a selector pin and thus be in an inoperative position.

The present invention may be embodied in other specific forms without departing from the spirit or essential attributes thereof and, accordingly, reference should be made to the appended claims, rather than to the foregoing specification as indicating the scope of the invention.

I claim:
1. In a tow truck switching system comprising a reference surface having a main slot intersected by at least one shunt slot, a switch plate adjacent said intersection, said switch plate being mounted for rotation about an axis generally perpendicular to the reference surface from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection including a member disposed to one side of said main slot, means biasing said member to a normal position wherein at least a portion of said member extends above said reference surface, means mounting said member and its support for movement against the effect of said biasing means into the plane of said reference surface, mechanical means connecting said member to said switch plate for enabling rotation of said switch plate to one of said positions in response to contact of said member with a portion of a tow truck traveling along said main slot.

2. In a tow truck switching system in accordance with claim 1 including a protection means for said member mounted for movement with said member, said protection means projecting upwardly above said member, said protection means being in part disposed alongside said member.

3. In a tow truck switching system comprising a reference surface having a main slot intersected by at least one shunt slot, a switch plate adjacent said intersection, said switch plate being mounted for movement from an inoperative to an operative position, said switch plate in its operative position presenting an abutment surface in the main slot for contact with a tow pin on a tow truck traveling along said main slot to guide the tow pin into said shunt slot, selectively operable means adjacent said intersection for moving said switch plate from said inoperative to said operative position, said selectively operable means including a pivotable treadle extending above said reference surface to one side of said main slot, and mechanical means connecting said treadle to said switch plate for moving said switch plate in response to pivotable movement of said treadle, said treadle being adapted to pivot in response to contact by a selector pin on a tow truck traveling along said main slot, and a reset means structurally interrelated with said main slot and said switch plate for moving said switch plate from its operative to inoperative position if said treadle is accidentally actuated.

4. In a tow truck switching system comprising a reference surface having an aperture and a main slot intersected by at least one shunt slot, a switch plate adjacent said intersection, said switch plate being mounted for movement from an inoperative to an operative position, said switch plate in one of its positions presenting an abutment surface in the main slot for contact with a tow pin on a tow truck traveling along said main slot to guide the tow pin into said shunt slot, selectively operable means adjacent said intersection for moving said switch plate from one of its positions to its other position, said selectively operable means adapted to be actuated by a selector pin on a tow truck traveling along said main slot, and a reset means partially projecting into the plane of the main slot and structurally interrelated with said plate for moving said switch plate from its one position to its other position.

5. In a tow truck switching system comprising a reference surface having a main slot intersected by at least one shunt slot, a switch plate adjacent said intersection, said switch plate bing mounted for rotation about an axis generally perpendicular to the reference surface from an inoperative to an operative position, said switch plate in its operative position presenting an abutment surface in the main slot for contact with a tow pin on a tow truck traveling along said main slot to guide the tow pin into said shunt slot, conveyor means beneath said main slot for engaging a tow pin on a tow truck and moving said tow truck along said main slot, selectively operable means adjacent said intersection for rotating said switch plate from said inoperative to said operative position, said selectively operable means adapted to be actuated by a selector pin on a tow truck traveling along said main slot, and a reset mechanism structurally interrelated with said main slot and switch plate for moving said switch plate from its operative to inoperative position if said selectively operable means is indiscriminately actuated by means other than a selector pin, said reset mechanism including a pivotable contact member projecting into said main slot adjacent said intersection, and mechanical means coupling said contact member to said switch plate for rotating said switch plate from its operative to its inoperative position in response to pivoting of said contact member by a portion of said conveyor means.

6. In a tow truck switching system comprising a reference surface having a main slot intersected by at least one shunt slot, a switch plate adjacent said intersection, said switch plate being mounted for rotation about an axis generally perpendicular to the reference surface from an inoperative to an operative position, said switch plate in its operative position presenting an abutment surface in the main slot for contact with a tow pin on a tow truck traveling along said main slot to guide the tow pin into said shunt slot, selectively operable means adjacent said intersection for rotating said switch plate from said inoperative to said operative position, said selectively operable means being adapted to be actuated by a selector pin on a tow truck traveling along said main slot, and a reset mechanism structurally interrelated with said main slot and switch plate for moving said switch plate from its operative to its inoperative position if said selectively operable means is indiscriminately actuated by means other than a selector pin, said reset mechanism including a pivotable contact member projecting into said main slot adjacent said intersection, and mechanical means coupling said contact member to said switch plate for rotating said switch plate from its operative to its inoperative position in response to pivoting of said contact member.

7. In a tow truck switching system comprising a reference surface having a main slot intersected by at least one shunt slot, a switch plate adjacent said intersection, said switch plate being mounted for rotation about an axis generally perpendicular to the reference surface from an inoperative to an opeartive position, said switch plate in its operative position presenting an abutment surface in the main slot for contact with a tow pin on a tow truck traveling along said main slot to guide the tow pin into said shunt slot, and selectively operable means adjacent said intersection for rotating said switch plate from said inoperative to said operative position, said selectively operable means including a pivotable treadle extending above said reference surface on one side of said main slot, a rotatable switch arm connected to said switch plate, means for urging said switch arm to rotate said switch plate to its operative position, latch means in contact with said switch arm for preventing said urging means from rotating said switch arm, and means coupling said treadle to said latch means for rendering said latch means ineffective in response to pivotable movement of said treadle whereby said urging means can rotate said switch arm and switch plate to its operative position, said treadle being adapted to pivot in response to contact by a selector pin on a tow truck traveling along said main slot.

8. In a tow truck switching system comprising a reference surface having a main slot intersected by at least one shunt slot, a switch plate adjacent said intersection, said switch plate being mounted for rotation about an axis generally perpendicular to the reference surface from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection for rotating said switch plate from said inoperative to said operative position, said selectively operable means including a pivotable treadle extending above said reference surface and disposed on one side of said main slot, a rotatable switch arm connected to said switch plate, means for urging said switch arm to rotate said switch plate to its operative position, latch means in contact with said switch arm for preventing said urging means from rotating said switch arm, means coupling said treadle to said latch means for rendering said latch means ineffective in response to pivotable movement of said treadle whereby said urging means can rotate said switch arm and switch plate to its operative position, said treadle being adapted to pivot in response to contact by a selector pin on a tow truck traveling along said main slot, and a contact member connected to said switch plate and projecting into said shunt slot when said switch plate is in its operative position, said contact member being adapted to rotate said switch plate to its inoperative position against the bias of said urging means when contacted by a tow pin of a tow truck in said shunt slot.

9. In a tow truck switching system comprising a reference surface having a main slot intersected by at least one shunt slot, a switch plate adjacent said intersection, said switch plate being mounted for movement from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection for moving said switch plate from said inoperative to said operative position, said selectively operable means including a treadle extending above said reference surface and to one side of said main slot, means connecting said treadle to said switch plate for moving said switch plate in response to movement of said treadle, said treadle being adapted to move in response to contact by a selector pin on a tow truck traveling along said main slot, means for preventing more than a predetermined number of trucks from being diverted into said one shunt slot, means structurally interrelated with the main slot for causing the switch plate to assume its inoperative position when said last mentioned means is actuated, and means structurally interrelated with said one shunt slot for causing the switch plate to assume its inoperative position when said last mentioned means is actuated.

10. In a tow truck switching system comprising a reference surface having a main slot intersected by at least one shunt slot, a switch plate adjacent said intersection, said switch plate being mounted for movement from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection for moving said switch plate from said inoperative to said operative position, said selectively operable means including a pivotable treadle extending above said reference surface and on one side of said main slot, a rotatable switch arm connected to said switch plate, first spring means for urging said switch arm to rotate said switch plate to its operative position, latch means in contact with said switch arm for preventing said spring means from rotating said switch arm, means coupling said treadle to said latch means for rendering said latch means ineffective in response to pivotable movement of said treadle whereby said spring means can rotate said switch arm and switch plate to its operative position, said treadle being adapted to pivot in response to contact by a selector pin on a tow truck traveling along said main slot, and an overload prevention device structurally interrelated with said shunt slot and switch plate for preventing more than a predetermined number of trucks from accumulating along said shunt slot, said device including a pivotable contact member, second spring means opposing the urging of said first spring means connecting said contact member to said switch arm, said second spring means being operative upon pivotable movement of said contact member to prevent said first spring means from moving said switch arm and switch plate regardless of subsequent pivotable movement of said treadle.

11. In a tow truck switching system comprising a reference surface having a main slot intersected by at least one shunt slot, a switch plate adjacent said intersection, said switch plate being mounted for movement from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection for rotating said switch plate from said inoperative to said operative position, said selectively operable means including a treadle extending through said reference surface, support means for said treadle, at least a portion of said support means being below said reference surface on one side of said main slot, said support means being constructed and arranged to permit the treadle to be depressed into the plane of the reference surface without actuating the treadle, means connected to said support means for maintaining said treadle in a predetermined position above said reference surface, and mechanical means connecting said treadle to said switch plate for moving said switch plate in response to actuation of said treadle, said treadle being adapted to be actuated by a portion of a tow truck traveling along said main slot.

12. In a tow truck switching system in accordance with claim 11 wherein said support means includes a rigid guide plate on opposite sides of the treadle, said plates projecting above said reference surface to a height above the uppermost edge of the treadle, whereby the treadle may move into the plane of the reference surface when pressure or weight is applied on the plates, and said plates pivotably supporting said treadle.

13. In a tow truck switching system in accordance with claim 11 including an overload protection device disposed along the shunt slot for preventing said switch plate from moving to its operative position when a predetermined number of trucks have accumulated along the shunt slot.

14. In a tow truck switching system comprising a reference surface having a main slot intersected by at least one shunt slot, a switch plate adjacent said intersection, said switch plate being mounted for rotation about an axis generally perpendicular to the reference surface from an inoperative to an operative position, said switch plate in its operative position presenting an abutment surface in the main slot for contact with a tow pin on a tow truck traveling along said main slot to guide the tow pin into said shunt slot, and selectively operable means adjacent said intersection for rotating said switch plate from said inoperative to said operative position, said selectively operable means including a treadle extending through said reference surface, support means for said treadle, a portion of said support means being below said reference surface on one side of said main slot and supported for pivotable movement about a horizontal axis, said support means including plates on opposite sides of the treadle, said treadle being pivotably supported by said plates, said plates and treadle projecting through an aperture in said surface to a position thereabove, said plates and treadle being movable into said aperture while pivoting about said horizontal axis when a force is applied against said plates, and means connecting said treadle to said switch plate for moving said switch plate to its operative position in response to actuation of said treadle, said treadle being adapted to be actuated by contact by a portion of a tow truck traveling along said main slot.

15. In a tow truck switching system comprising a reference surface having a main slot intersected by at least one shunt slot, a switch plate adjacent said intersection, said switch plate being mounted for movement from an inoperative to an operative position, said switch plate in its operative position presenting an abutment surface in the main slot for contact with a tow pin on a tow truck traveling along said main slot to guide the tow pin into said shunt slot, selectively operable means adjacent said intersection for moving said switch plate from said inoperative to said operative position, and said reference surface along said shunt slot being sloped downwardly from the plane of said surface along the main slot.

16. A tow truck system comprising a reference surface having a main slot intersected by at least one shunt slot, a switchplate adjacent said intersection, said switchplate being mounted for movement from an inoperative to an operative position, said switchplate in its operative position presenting an abutment surface in the main slot for contact with a tow pin on a tow truck traveling along said main slot to guide the tow pin into said shunt slot, said switch plate in its inoperative position obstructing said shunt slot and forming a portion of the main slot, means biasing said plate to one of said positions, a selectively operable means for rendering said biasing means ineffective, said selectively operable means including an abutment surface movably supported adjacent said intersection and adapted to be contacted by an element on a truck moving along the main slot, said abutment surface being constructed and arranged to render said biasing means effective to move said plate to said one position in response to contact with an element on a truck moving along the main slot, protector means adjacent said abutment surface for preventing said surface from being inadvertently contacted by a structure other than a tow pin moving parallel to the main slot, and means biasing said abutment surface and its protector means to a position above said reference surface.

17. A system in accordance with claim 16 wherein said one position of said plate is the operative position of said plate.

18. A system in accordance with claim 16 wherein said one position of said plate is the inoperative position of said plate.

19. A subcombination for use in a tow truck system wherein a tow truck is desired to have its normal movement along a main slot interrupted and thereafter continued along a shunt slot which intersects the main slot comprising a movable actuator member for installation at least partially above ground level and adapted to be contacted by a portion of a tow truck, means for mounting said member for movement into the plane of a surface defining ground level, means biasing said member to a position above ground level, and a protector means adjacent said member to prevent said member from being inadvertently actuated and to cause said member to move into the plane of the ground level when subjected to an unintentional force having a downward force component.

20. The subcombination in accordance with claim 19 wherein said member is a pivotably mounted treadle supported by said protector means, and said protector means being pivotably mountable below said surface for movement with said treadle about an axis substantially parallel to ground level.

References Cited by the Examiner

UNITED STATES PATENTS 3,103,183   9/1963   Bradt et al. _____ 104—88
3,103,895   9/1963   Bradt et al. _____ 104—88

ARTHUR L. LA POINT, *Primary Examiner.*

S. B. GREEN, *Assistant Examiner.*